US006737488B2

(12) United States Patent
Vanhoorne et al.

(10) Patent No.: US 6,737,488 B2

(45) Date of Patent: May 18, 2004

(54) CONTROLLED FREE-RADICAL POLYMERIZATION PRODUCTS USING NEW CONTROL AGENTS

(75) Inventors: Pierre Vanhoorne, Düsseldorf (DE); Rolf-Volker Meyer, Much (DE); Christophe Detrembleur, Köln (DE); Robert Jérôme, Sart-Jalhay (BE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/082,607

(22) Filed: Feb. 25, 2002

(65) Prior Publication Data

US 2002/0165331 A1 Nov. 7, 2002

(30) Foreign Application Priority Data

Feb. 28, 2001 (EP) ........................................... 01104451

(51) Int. Cl.[7] ................................................... C08F 4/00

(52) U.S. Cl. ....................... 526/220; 526/217; 526/258; 525/374; 568/924; 568/949

(58) Field of Search ................................ 526/220, 258, 526/217; 525/374; 568/924, 949

(56) References Cited

U.S. PATENT DOCUMENTS

| | | | | |
|---|---|---|---|---|
| 3,964,979 | A | 6/1976 | Watson | 203/9 |
| 4,040,912 | A | 8/1977 | Watson | 203/9 |
| 4,581,429 | A | 4/1986 | Solomon et al. | 526/220 |
| 6,262,206 | B1 | 7/2001 | Nesvadba et al. | 526/220 |
| 2001/0008928 | A1 | 7/2001 | Nesvadba et al. | 526/220 |
| 2001/0039315 | A1 | 11/2001 | Nesvadba et al. | 525/374 |

FOREIGN PATENT DOCUMENTS

| | | | |
|---|---|---|---|
| DE | 26 60 230 | | 4/1979 |
| EP | 1 061 059 | | 12/2000 |
| WO | 98/01478 | | 1/1998 |
| WO | WO 98/13392 | * | 4/1998 |
| WO | WO 99/03894 | * | 1/1999 |

OTHER PUBLICATIONS

Acc. Chem. Res., (month unavailable) 1999, 32, 895–903, "Copper(I)–Catalyzed Atom Transfer Radical Polymerization" by T. E. Patten and K. Matjaszewski.

J.M.S.–Pure Appl. Chem., (month unavailable) 1998, A35(2), pp. 401–409, "Free Radical Polymerization in Aqueous Solution of Acrylic Acid Mediated By Nitroxides Originated from $NaNO_2$" by E. Bortel, A. Kochanowski, S. Kudla and E. Witek.

Mendeleev Comm., 6, (month unavailable) 1999, pp. 250–251 "2–Methyl–2–nitrosopropane as a new regulator of the polymer chain growth" by D. F. Grischin, L. L. Semyonycheva and E. V. Kolyakina.

Journal of Polymer Science: Part A: Polymer Chemistry, vol. 38, (month unavailable) 2000 pp. 2121–2136, "Iniferter Concept and Living Radical Polymerization" by T. Otsu.

* cited by examiner

*Primary Examiner*—Tatyana Zalukaeva

(74) *Attorney, Agent, or Firm*—Joseph C. Gil; Gary F. Matz; Aron Preis

(57) ABSTRACT

A process for the production of polymers by means of pseudo-living free-radical polymerization is disclosed. The process entails (i) reacting a polymerizable vinyl monomer with nitrogen monoxide and at least one initiator to prepare a free-radical intermediate product, and (ii) polymerizing the intermediate product optionally together with one or more additional monomers and/or with a free-radical initiator.

10 Claims, 12 Drawing Sheets

CONTROLLED FREE-RADICAL POLYMERIZATION PRODUCTS USING NEW CONTROL AGENTS

FIELD OF THE INVENTION

The present invention relates to a process for the preparation of polymers via controlled "pseudo-living" free-radical polymerization of vinyl monomers using nitrogen monoxide.

SUMMARY OF THE INVENTION

A process for the production of polymers by means of pseudo-living free-radical polymerization is disclosed. The process entails (i) reacting a polymerizable vinyl monomer with nitrogen monoxide and at least one initiator to prepare a free-radical intermediate product, and (ii) polymerizing the intermediate product optionally together with one or more additional monomers and/or with a free-radical initiator.

BACKGROUND OF THE INVENTION

Figure 1:
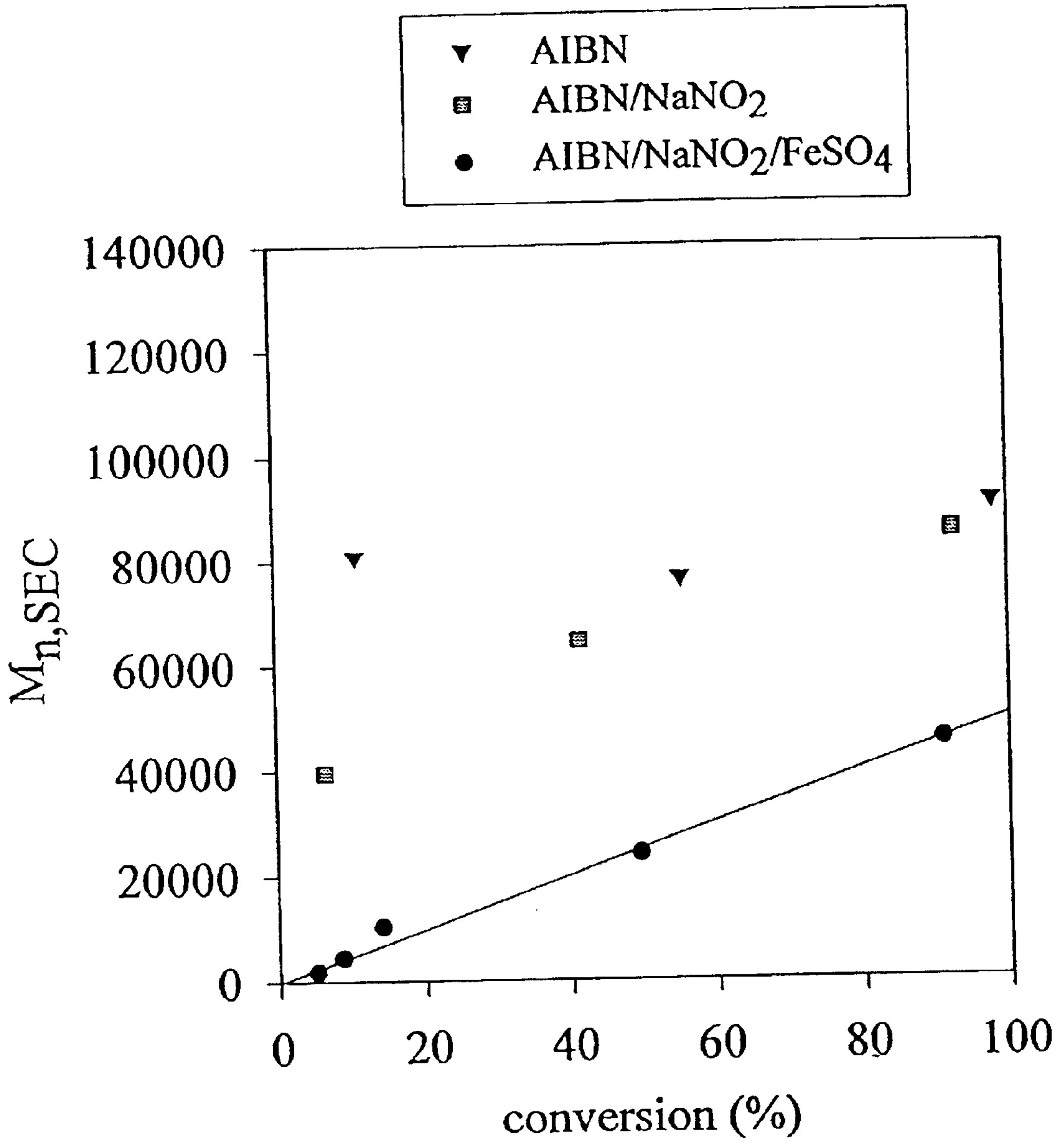
FIG. 1 shows the relationship between number average molecular weight and conversion for polymerizations with and without and activator according to the invention.

Nowadays, the demand for homopolymers, random copolymers and block copolymers of a specific molecular weight, a narrow molecular weight distribution and/or well-defined end groups has continuously increased in a number of industries. The controlled structure of these macromolecules provides them with novel properties and allows a tailor-made property profile to be obtained. Thus many new technologies require controlled polymer structures, such as for example in the fields of electronics, computer science, communications, genetic engineering, biotechnology and materials science.

Well-defined polymers can for example be produced by ionic living polymerization processes. However, ionic processes require drastic reaction conditions, such as for example temperatures of about −78° C., extreme dryness and the absence of protic species and only a few monomers can be used.

In contrast to ionic processes, free-radical polymerization can be carried out under mild conditions and a wide range of monomers can be used. Significant progress in the control of free-radical polymerization has been made.

Otsu et al., for example, were the first to report on the possible control of the free-radical polymerization of some vinyl monomers based on the iniferter concept (see: J. Polym. Sci.: Part A: Polym. Chem. 2000, 38, 2121). Meanwhile three main methods of controlled free-radical polymerization, sometimes described as "living" free-radical polymerization, have been developed:

(I) Nitroxide-mediated polymerization (NMP), which is based on the reversible capture of the propagating radicals by nitroxide radicals to form dormant chains. This strategy is disclosed for example in U.S Pat. No. 4,581,429. This process is handicapped by slow polymerization kinetics, a limited range of suitable monomers and the high cost of the required nitroxide radicals.

(II) Atom transfer radical polymerization (ATRP), which involves the reversible trapping of the propagating chains by halogen atoms and is mediated by metallic catalysts, is described extensively in Acc. Chem. Res. 1999, 32, 895. A serious drawback of this method is the use of transition metal catalysts (Fe, Cu) which are potentially toxic, impart colour to the resulting polymers and lead to corrosion problems. Removal of the catalyst from the resulting polymers is possible but relatively costly.

(III) Reversible addition-fragmentation chain transfer (RAFT) using dithio esters as transfer agents, which is disclosed for example in WO 98/01478. This method is limited to specific monomers and uses costly dithio esters which impart an unpleasant smell to the resulting polymers.

Although controlled free-radical polymerization represents an attractive method of obtaining new polymer structures there is still a need for an inexpensive, versatile control method that can be applied to a broad range of monomers.

One method of obtaining alkoxyamine initiators as nitroxide precursors has been described in WO 98/13392 and in EP-A 0 891 986. Conventional free-radical initiators are decomposed thermally in the presence of nitrogen monoxide NO. The resulting NO compounds can be used as initiators for controlling the free-radical polymerization of vinyl monomers. A disadvantage of these initiators is that polymerization appears to be controlled only for short polymer chains with number average molecular weights smaller than 15,000. Most industrially relevant polymers have to possess a number average molecular weight in excess of 50,000 in order to display the desired mechanical properties such as rigidity, elasticity or toughness. In addition, the methods described in the cited prior art still require the synthesis and isolation of the initiators in a step separate from the polymerization.

When added directly during free-radical polymerization nitrogen monoxide is reported (such as for example in DE-A 2 660 230, U.S. Pat. Nos. 4,040,912 and 3,964,979) to be a polymerization inhibitor.

Under appropriate conditions sodium nitrite may be used as a precursor of nitroxide compounds. Since sodium nitrite is inexpensive, this could provide a cheap method of access to nitroxide radicals.

The prior art has already mentioned sodium nitrite as a control agent for free-radical polymerization. For instance, EP-A 1 061 059 mentions sodium nitrite as an inhibitor of the free radical polymerization of butadiene when used in combination with specific phosphorus-containing compounds. The possible control of polymerization under such conditions is not disclosed.

In attempts to reduce gel formation during the polymerization of concentrated solutions of sodium acrylate in water, Bortel et al. (J.M.S.-Pure Appl. Chem. 1998, A35(2), 401) observed that adding sodium nitrite inhibits polymerization up to a polymerization temperature of 60° C. It was found that although the molecular weight of the polymer increases slightly with time, the polydispersity ($D=\overline{M}_w/\overline{M}_n$) is very high (typically D higher than 6), this being a clear indication of "classical" free-radical polymerization. Other monomers than sodium acrylate are not disclosed.

The in-situ formation of NO compounds from free radical initiators and nitroso compounds is reported in Mendeleev Comm. 1999, 6, 250. Similar compounds can also be formed by the reaction of free radical initiators with nitrones as reported in WO 99/03894. These methods still however require the use of preformed reagents which may be toxic.

DETAILED DESCRIPTION OF THE INVENTION

The present invention is based on the problem of providing homo- and copolymers of controlled molecular weight and controlled molecular structure by a simple and inexpensive method of controlling the free-radical polymerization of vinyl monomers that overcomes the drawbacks encountered in the prior art.

It has now been found that the free radical polymerization of vinyl monomers and of vinyl monomer mixtures can be easily controlled with respect to the molecular weight or molecular weight distribution of the resulting homopolymers, random and block copolymers if it is conducted in the presence of a reaction product of at least one vinyl monomer with nitrogen monoxide and at least one free-radical initiator.

The present invention relates to a process for producing polymers by means of controlled pseudo-living free-radical polymerization of olefinically unsaturated monomers using nitrogen monoxide.

In the present process, in a first step a free-radical intermediate product of the general formula (I),

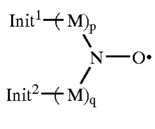

(I)

in which

M represents a vinyl monomer, p is an integer of 1 to 15 , q is an integer of 1 to 15 and $Init^1$ and $Init^2$ independently one of the other denote a radical of a free-radical initiator, is produced by reacting at least one vinyl monomer with nitrogen monoxide and at least one initiator and then in a second step the polymerization is carried out optionally with the addition of an additional monomer or monomer mixture and/or free-radical initiator.

The free-radical intermediate product of the general formula (I) may optionally be isolated. Preferably the process according to the invention is carried out in the form of a one-pot synthesis.

The polymerization process of the present invention may be used to prepare various polymers of low polydispersity, which include for example end-functionalized polymers, block, multiblock or gradient polymers, star-shaped polymers or graft and branched polymers.

The first and second steps of the polymerization may generally be carried out in different temperature ranges. The polymerization step of the process according to the invention may also optionally be carried out in several stages, it being possible to add the required monomer or monomer mixture at any stage. Using this method block copolymers may for example be produced. The excess monomer or monomer mixture may optionally be removed at the end of each stage before continuing with the addition of further monomer.

Monomers or combinations of monomers known for free-radical polymerization may be polymerized according to the invention.

Monomers M that may be used in the first step of the present invention are any polymerizable vinyl monomers such as styrene, α-methylstyrene, p-methylstyrene and other alkylstyrenes, acrylic and methacrylic acid and alkyl esters thereof, (meth)acrylamide, (meth)acrylonitrile, acrolein, vinyl acetate, vinyl chloride, conjugated dienes and vinylpyridine. Preferred monomers are styrene, α-methylstyrene and alkylstyrenes, acrylic and methacrylic acid and alkyl esters thereof, acrylonitrile, butadiene or isoprene. Particularly preferred monomers are acrylic and methacrylic alkyl esters and acrylonitrile. In particular M may also represent different vinyl monomers, such as for example where the compound (I) is formed by reacting nitrogen monoxide with at least one initiator and a mixture of vinyl monomers.

Typical monomers M suitable for the second step of the present invention are for example styrene, α-methylstyrene, p-methylstyrene and other alkylstyrenes, acrylic and methacrylic acid and alkyl esters thereof, (meth)acrylamide, (meth)acrylonitrile, acrolein, vinyl acetate, vinyl chloride, conjugated dienes, vinylpyridines, maleic acid and the anhydride thereof and fumaric acid. Preferred monomers are styrene, α-methylstyrene and alkylstyrenes, acrylic and methacrylic acid and alkyl esters thereof, acrylonitrile, butadiene, isoprene and maleic anhydride. Particularly preferred monomers are acrylic and methacrylic acid and alkyl esters thereof, styrene, α-methylstyrene, acrylonitrile and butadiene.

In the process according to the invention nitrogen monoxide is for example either introduced into the reaction medium directly in the form of a nitrogen oxide gas or produced by an in situ reaction between a nitrite compound and an activator component. Suitable activator components are for example reducing or oxidizing agents or acids.

The gaseous nitrogen monoxide used in the process according to the invention may be used in pure form or as a mixture with gaseous nitrogen oxides of the general formula (II)

$$N_x O_y \quad (II)$$

in which a) x is 1 and y is 2 or b) x is 2 and y is 1,3,4 or 5, in any desired ratios between the monoxide and (II).

In a preferred embodiment of the invention nitrogen monoxide is produced in situ by a reaction between a nitrite compound and an activator component.

Suitable nitrite components are both inorganic and organic nitrite compounds. Inorganic nitrite compounds are for example compounds of the general formula (III), $$Z(NO_2)_n \quad \text{(III)}$$

in which

Z is selected from the group consisting of alkaline, alkaline earth, earth or transition metals or lanthanide or actinide or from one of the cations $Sn^{2+}$, $Sn^{4+}$, $In^{3+}$, $Tl^{+}$, $Tl^{3+}$, $Pb^{2+}$, $Bi^{3+}$, $Sb^{3+}$, $Sb^{5+}$ or $NH_4^+$ and n is 1 to 5.

Suitable organic nitrite compounds are for example compounds of the general formula (IV), $$R—O—N=O \quad \text{(IV)}$$

in which

R is an organic radical containing at least 2 carbon atoms and other functional groups, selected from the group comprising esters, thioesters, ethers, thioethers, alcohols, thiols, amines, amides, imines, imides, urethanes, halogen, nitro, nitroso, nitrates, nitrites, sulfates, sulphones, nitriles, carboxylic acids, carboxylic anhydrides, aldehydes and ketones.

Preferred compounds of formula (IV) are for example water-soluble salts, where Z is a mono- or divalent cation. Particularly preferred are for example those where Z is an alkaline cation or $NH_4$+.

Preferred compounds of formula (IV) are for example those where R is an organic radical containing 2 to 6 carbon atoms. Particulary preferred compounds of formula IV are for example isoamyl nitrite, propyl nitrite, n-butyl nitrite or tert-butyl nitrite.

Suitable reducing agents for use as activators for the present invention are all known reducing agents, such as for example Fe(II), Cu(I) and Ti(III) salts, ascorbic acid, formic acid, tartaric acid, oxalic acid and salts thereof, alkaline hydroxymethanesulfinate salts, dextrose, formaldehyde, hydrogen peroxide, sodium sulfite, sodium and potassium thiosulfate, 2-mercaptoethanol and other thiols. In a preferred embodiment the reducing agents are Fe(II) salts, ascorbic acid, formic acid, oxalic acid, formaldehyde or dextrose. Particularly preferred reducing agents are Fe(II) sulfate, ascorbic acid and dextrose.

Suitable oxidants for use as activators for the present invention are for example Fe(III), Cr(III), Cu(II), Ti(IV), Sn(IV), Hg(II) salts, alkaline permanganates, alkaline chromates, hydrogen peroxide, alkaline hypochlorites. Preferred oxidants are Fe(III), Cu(II) and Cr(III) salts. Particularly preferred oxidants are Fe(III) and Cr(III) sulfates.

Suitable acids for use as activators are for example strong and weak inorganic and organic acids, such as for example hydrochloric acid, sulfuric acid, phosphoric acid, formic acid, ascorbic acid, acetic acid, tartaric acid, oxalic acid and methanesulfonic acid. In a preferred embodiment the acid is for example sulfuric acid, phosphoric acid, acetic acid or methanesulfonic acid. Particularly preferred acids are sulfuric and acetic acids.

The activator or mixture of activators is used in amounts of 0.01 to 500 mol %, preferably 0.1 to 300 mol %, most preferably 1 to 200 mol %, based on the nitrite component.

Suitable free-radical initiators for both steps of the present invention are any suitable agents producing free radicals, including precursors such as azo compounds, peroxides or peroxy esters, which generate radicals for example by thermolysis, or precursors such as styrene, which generate radicals by autopolymerization. Also suitable are redox initiating systems such as $K_2S_2O_8$+$FeSO_4$, photochemical initiating systems or high energy radiation such as electron beam or X- or γ-radiation. In the latter case the molar amount of radicals generated in the polymerization medium represents the molar amount of initiator and may be calculated based on the total amount of radiation energy and the radical generation efficiency of the type of radiation employed.

Initiators may also be molecules containing free radicals such as oxygen, nitrogen dioxide and ozone.

Examples of free radical initiators generating radicals by thermolysis are 2,2'-azobis(isobutyronitrile), 2,2'-azobis (isovaleronitrile), 2,2'-azobis(methyl isobutyrate), 4,4'-azobis(4-cyanopentanoic acid), 1,1'-azobis(1-cyclohexanecarbonitrile), 2-tert-butylazo-2-cyanopropane, 2,2'-azobis[2-methyl-N-(1,1-bis(hydroxymethyl)-2-hydroxyethyl propionamide], 2,2'-azobis[2-methyl-N-(2-hydroxyethyl) propionamide], 2,2'-azobis (isobutyramidine hydrochloride), 2,2'-azobis(N,N'-dimethylene isobutyramine), 2,2'-azobis[2-methyl-N-(1,1-bis (hydroxymethyl)-2-ethyl)-propion-amide], 2,2'-azobis[2-methyl-N-(2-hydroxyethyl)propionamide], 2,2'-azo-bis (isobutyramide)dihydrate, 2,2'-azobis(2,2,4-trimethylpentane), 2,2'-azobis(2-methylpropane), tert-butyl peroxyacetate, tert-butyl peroxybenzoate, tert-butyl peroxyoctoate, tert-butyl peroxyneodecanoate, tert-butyl peroxyisobutyrate, tert-amyl peroxypivalate, tert-butyl peroxypivalate, diisopropyl peroxydicarbonate, dicyclohexyl peroxydicarbonate, dicumyl peroxide, dibenzoyl peroxide, dilauroyl peroxide, potassium peroxydisulfate, ammonium peroxydisulfate, di-tert-butyl hyponitrite and dicumyl hyponitrite.

Initiators generating radicals by photolysis include for example benzoin derivatives, benzophenone, acyl phosphine oxides and photoredox systems.

Initiators generating radicals as a result of a redox reaction consist in general of a combination of an oxidant and a reducing agent. Suitable oxidants are for example potassium peroxydisulfate, hydrogen peroxide, tert-butyl hydroperoxide, cumyl hydroperoxide, benzoyl peroxide and p-menthane hydroperoxide. Suitable reducing agents are for example Fe(II) salts, Ti(III) salts, potassium thiosulfate, potassium bisulfite, ascorbic acid and its salts, oxalic acid and salts thereof, hydrogen peroxide and dextrose.

The first step of the process according to the invention is carried out at a temperature between 0 and 120° C., preferably between 20 and 100° C., and most preferably between 40 and 80° C.

In the second step the polymerization is carried out in the presence of the intermediate product formed in the first step at temperatures between 20 and 180° C., preferably between 50 and 150° C., and most preferably between 60 and 130° C.

The monomer is added in an amount of at least 100 mol %, preferably at least 300 mol %, and most preferably at least 500 mol %, based on nitrogen monoxide.

Where the intermediate product is formed in a completely separate step from the polymerization step, such as for example when the intermediate product is isolated before further use, or where the monomer or monomer mixture to be polymerized is different from the monomer or monomer mixture used in the formation of the intermediate product, the monomer used in the formation of the intermediate product is added in an amount of at most 15,000 mol %, preferably at most 10,000 mol %, and most preferably at most 5,000 mol %, based on nitrogen monoxide.

Where the intermediate product is formed in a "one-pot" process before the polymerization step is begun, the maximum amount of monomer or monomer mixture used in the first step may already be the amount of monomer required for the polymerization step and it depends on the molecular weight of the desired polymers. Typically this amount of monomer will be no more than 1,000,000 mol %, preferably no more than 500,000 mol %, and most preferably no more than 300,000 mol %, based on nitrogen monoxide.

If the monomer or monomer mixture to be polymerized is not present in the first step, the monomer or monomer mixture to be polymerized according to the invention is added in a later stage in amounts depending on the desired molecular weight of the polymer, and typically in amounts of between 500 and 1,000,000 mol %, preferably between 1,000 and 500,000 mol %, and most preferably between 2,000 and 300,000 mol %, based on the initiator used in the polymerization step.

The initiator compound is added in an amount of between 0.01 and 200 mol %, preferably between 0.05 and 150 mol %, and most preferably between 0.1 and 100 mol %, based on nitrogen monoxide.

The polymerization of the second step of the present invention is initiated with a free radical initiator or a mixture of free radical initiators, in amounts between 0.1 and 500 mol %, preferably between 0.5 and 200 mol %, and most preferably between 1 and 100 mol %, based on nitrogen monoxide used in the first step for the formation of the intermediate product.

The process may be carried out in the presence of an organic solvent or in the presence of water or in mixtures thereof. When a nitrite component is used as a source of nitrogen monoxide, water promotes the reaction between the nitrite component and the activator component. Additional cosolvents or surfactants, such as glycols or salts of fatty acids or salts of quaternary ammonium compounds or ethylene-oxide based amphiphilic compounds, may be used.

If organic solvents are used, suitable solvents or mixtures of solvents are typically pure alkanes, aromatic hydrocarbons, halogenated hydrocarbons, alkanols, esters, ethers and ketones or mixtures thereof. Preferred solvents are for instance toluene, tetrahydrofurane, ethyl benzene, diethylether, hexane and methyl ethyl ketone.

Water may be used in the process of the present invention and both water-soluble monomers and water-insoluble monomers may be used. The type of polymerization used may be bulk, solution, emulsion, dispersion or suspension polymerization and it may be carried out both batchwise and continuously.

The present invention also relates to intermediate products of the general formula (I) which are obtainable by the process according to the invention.

The intermediate products according to the invention of the general formula (I) may be present as mixtures with oligomeric nitroso compounds.

The invention also relates to polymers of the general formula (V),

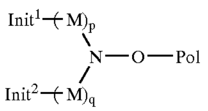

(V)

in which

Pol is a polymeric radical,

M represents a vinyl monomer, p is an integer of 1 to 15 , q is an integer of 1 to 15 and $Init^1$ and $Init^2$ independently one of the other denote a radical of a free-radical initiator.

The polymeric radical Pol contains structural units derived from the polymerization of the monomers used for step 2. Pol may be a linear-, block-, random-, graft- or star-copolymer.

The polymers according to the invention display a polydispersity $D=\overline{M}_w/\overline{M}_n<2$, preferably D<1.8, and most preferably D<1.5.

The present invention also relates to the use of the intermediate product of the general formula (I) in free-radical polymerization.

The present invention also relates to the use of polymers of the general formula (V) for the production of coatings and as compatibilizers in thermoplastic polymer blends.

The polymerization process according to the present invention has several benefits over the prior art:

Polymers with low polydispersity D may be prepared compared to the high polydispersity observed in case of conventional free radical polymerization (D>2). The polydispersity D of the polymers synthesized according to the invention is usually lower than 2 and may be significantly lower at low monomer conversion rates (<30%).

Another aspect of the present invention is that the number average molecular weight of the polymer chains increases linearly with the monomer conversion, which allows a tailor-made polymer molecular weight to be obtained. Furthermore, the molecular weight of the polymers may be controlled by varying the amount of initiator and/or the amount of nitrogen monoxide and/or the amount of monomers used in the reaction.

A further benefit of the present invention is that after removal of the non-polymerized monomers or after reaching a conversion of 100%, a second polymerization step may be initiated simply by adding to the polymer synthesized in the first polymerization step a portion of fresh vinyl monomer or monomer mixture that may be different from the vinyl monomer or monomer mixture used in the first polymerization step. The polymerization of the vinyl monomer or monomer mixture added in the second step is then initiated by the polymer chains synthesized in the first polymerization step and di-block copolymers may for example be generated if the polymer chains synthesized in the first polymerization step were linear chains with one single growing site. The molecular weight and molecular weight distribution of each block may be controlled independently during the respective polymerization step. The process of polymerization of a vinyl monomer or monomer mixture initiated by polymer chains synthesized in a previous polymerization step carried out according to the invention may be repeated, whereby for example multi-block-copolymers of controlled molecular weight and molecular weight distribution for each block may be obtained.

EXAMPLES

In the examples the following abbreviations are used:

AIBN: azobisisobutyronitrile

BeMA: benzyl methacrylate t-BMA: tert-butyl methacrylate

MMA: methyl methacrylate

Controlled free-radical polymerization of tert-butyl methacrylate in the presence of sodium nitrite and iron(II) sulfate.

Example 1

In the Presence of Sodium Nitrite and Iron(II) Sulfate:

0.0414 g $NaNO_2$ (6 *$10^{-4}$ mol), 0.0834 g $FeSO_4.7H_2O$ (3 *$10^{-4}$ mol) and 0.0492 g AIBN (3*$10^{-4}$ mol) were introduced into a 50 ml reaction flask that had been evacuated by three nitrogen-vacuum cycles. 20 ml of degassed water were then added and the flask was thermally stabilized at 80° C. Finally, 8 ml of t-BMA (5 *$10^{-2}$ mol) were added to the reaction flask. Samples were regularly removed from the polymerization medium and the % monomer conversion was calculated by $^1$H-NMR analysis of the organic phase.

Comparative Example 1

With Sodium Nitrite and Without Iron(II) Sulfate:

0.0492 g AIBN (3 *$10^{-4}$ mol) and 0.0414 g $NaNO_2$ (6 *$10^{-4}$ mol) were introduced into a 50 ml reaction flask that had been evacuated by three nitrogen-vacuum cycles. 20 ml of degassed water were then added and the flask was thermally stabilized at 80° C. Finally, 8 ml of t-BMA (5 *$10^{-2}$ mol) were added to the reaction flask. Samples were regularly removed from the polymerization medium and the % monomer conversion was calculated by $^1$H-NMR analysis of the organic phase.

Comparative Example 2

Without Sodium Nitrite and Without Iron(II) Sulfate:

0.0492 g AIBN (3 *$10^{-4}$ mol) were introduced into a 50 ml reaction flask that had been evacuated by three nitrogen-vacuum cycles. 20 ml of degassed water were then added and the flask was thermally stabilized at 80° C. Finally, 8 ml of t-BMA (5 *$10^{-2}$ mol) were added to the reaction flask. Samples were regularly removed from the polymerization medium and the % monomer conversion was calculated by $^1$H-NMR analysis of the organic phase.

Figure 2:
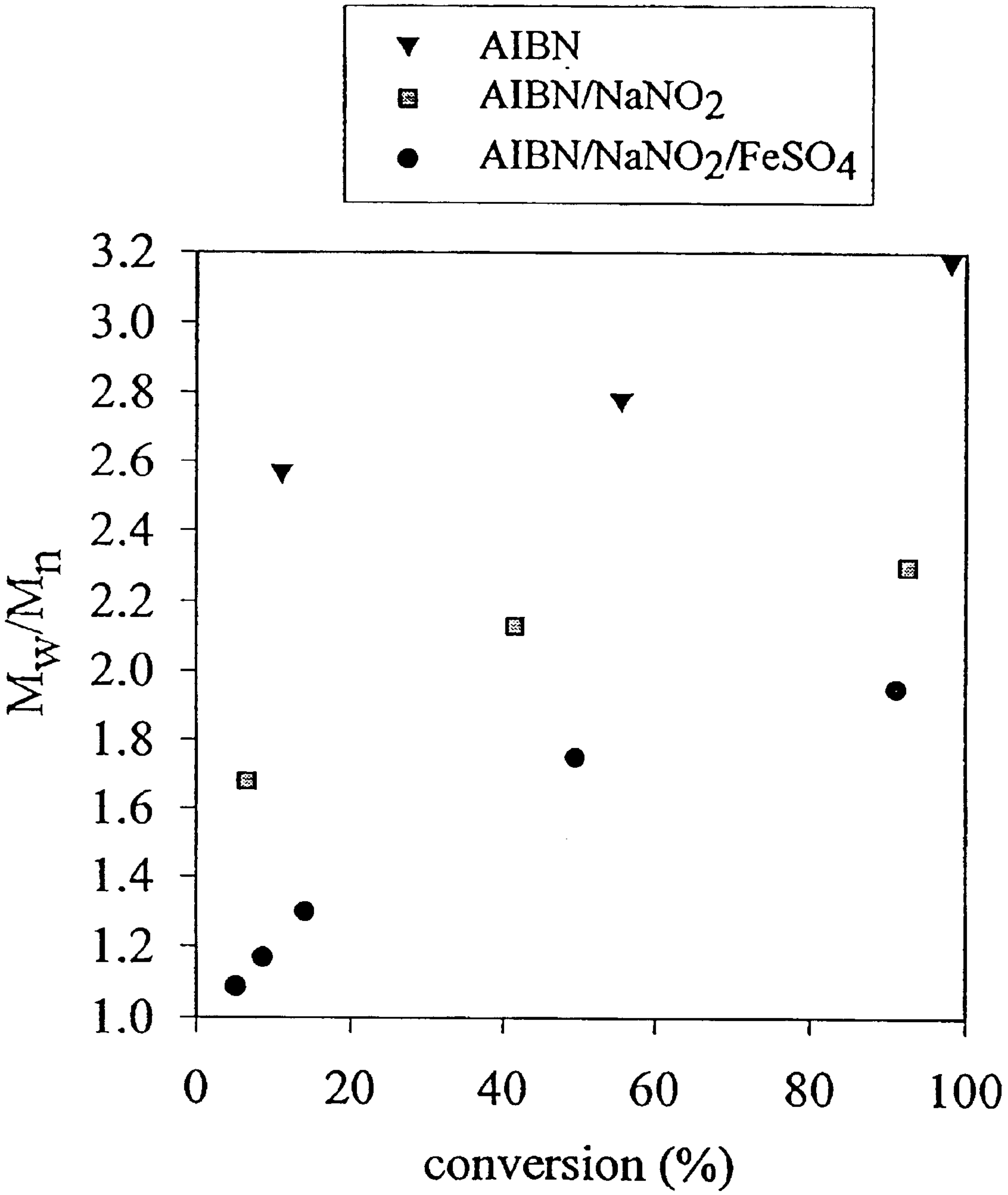
FIG. 2 shows the relationship between polydispersity (Mw/Mn) and conversion for polymerizations with and without and activator according to the invention.

The molecular weight and polydispersity of the resulting polymers are displayed in FIGS. 1 and 2.

Without sodium nitrite (comparative example 1), the polymerization takes place very rapidly (55% monomer conversion after 30 min), a high molecular weight polymer is formed in the early stages of the polymerization, and the polydispersity is high, as is consistent with a non-controlled process.

Whenever sodium nitrite alone is added (comparative example 2), the polydispersity is slightly lower compared to the previous non-controlled polymerization, and the $\overline{M}_n$ increases as the % monomer conversion increases. The polymerization rate is not basically different from that observed in the absence of sodium nitrite (41% monomer conversion after 30 min).

Only when both sodium nitrite and $FeSO_4$ are added to the polymerization medium (example 1) is nitrogen monoxide generated and the number average molecular weight increases linearly from the outset as the % monomer conversion increases, as is consistent with a controlled process. Also the molecular weight of the polymers synthesized is lower than in comparative examples 1 and 2. Furthermore, the polymerization carried out in the presence of sodium nitrite and $FeSO_4$ takes place more slowly than in the two previous cases (a monomer conversion of only 5% and 49% after 2 and 6h, respectively) and an induction period of 1 to 2 hours, corresponding to the formation of the intermediate product, is observed.

Example 2

Controlled Free-radical Polymerization of Tert-butyl Methacrylate With a Sodium Nitrite/$FeSO_4$/$K_2S_2O_8$ System (effect of the amount of sodium nitrite):

Experiment with a molar ratio of sodium nitrite to $K_2S_2O_8$ of 2:1. 0.0414 g of $NaNO_2$ (6 *$10^{-4}$ mol) and 0.0834 g of $FeSO_4.7H_2O$ (3 *$10^{-4}$ mol) were introduced into a 50 ml reaction flask that had been evacuated by three nitrogen-vacuum cycles. 15 ml of degassed water and 8 ml of t-BMA (5 *$10^{-2}$ mol) were then added and the flask was thermally stabilized at 80° C. Finally, 0.0811 g of $K_2S_2O_8$ (3 *$10^{-4}$ mol) in 5 ml of water were added. Samples were regularly removed from the polymerization medium and the monomer conversion was calculated by $^1$H-NMR analysis of the organic phase.

The same method is used for the other sodium nitrite/$K_2S_2O_8$ molar ratios by modifying the sodium nitrite amounts accordingly and keeping constant the amounts of the other constituents.

Figure 3:
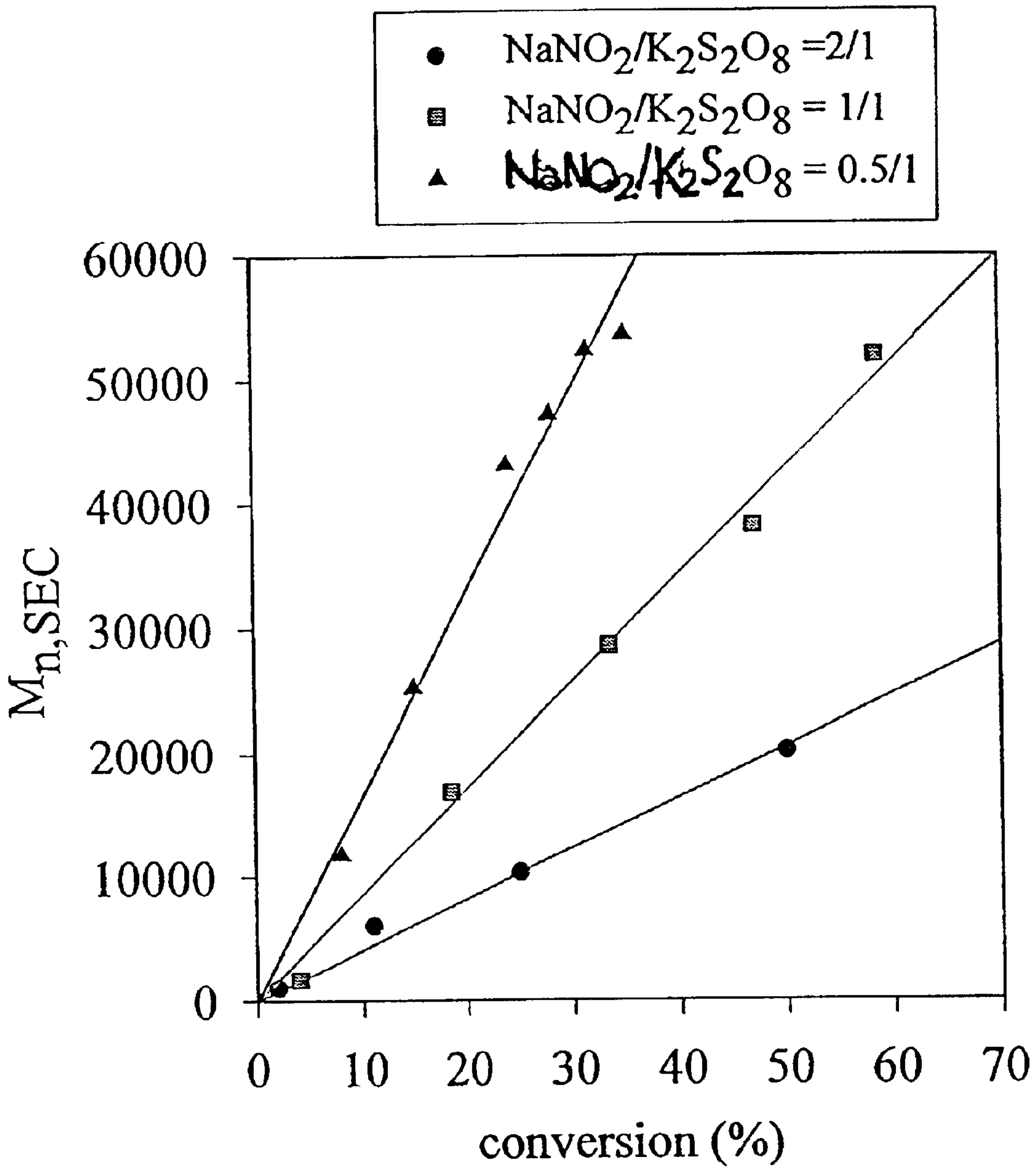
FIG. 3 shows the relationship between number average molecular weight and conversion for polymerizations according to the invention.

In FIG. 3 the molecular weight of the resulting polymers is plotted as a function of the monomer conversion.

As may be seen from FIG. 3, in all cases the molecular weight of the polymers increases linearly as the monomer conversion increases. In this case the molecular weight obtained at a given conversion may be controlled by adjusting the amount of sodium nitrite.

Example 3

Resumption Experiment in the Case of the Polymerization of Tert-butyl Methacrylate Synthesis of the Poly(t-BMA) Macroinitiator:

0.1656 g $NaNO_2$(2.4 *$10^{-3}$ mol) were introduced into a 250 ml reaction flask that had been evacuated by three nitrogen-vacuum cycles. 40 ml of degassed water and 32 ml of t-BMA (2 *$10^{-1}$ mol) were then added, and the flask was thermally stabilized at 80° C. When the temperature was reached a degassed solution of 0.4226 g ascorbic acid (2.4 *$10^{-3}$ mol) in 20 ml water was added to the flask and finally a degassed solution of 0.3244 g $K_2S_2O_8$ (1.2 *$10^{-3}$ mol) in 20 ml of water was added. After a reaction time of 1 h, the water and residual monomer were removed in vacuo and the intermediate product was dried overnight at room temperature. The conversion rate was between 5 and 10%.

Resumption Experiment:

10 ml of t-BMA (6.3 *$10^{-2}$ mol) were added to the non-purified macroinitiator described above and the flask was placed in an oil bath at 50° C. Samples were regularly removed from the polymerization medium and the % monomer conversion was calculated gravimetrically after drying at 80° C. in vacuo, taking into account the amounts of macroinitiator initially introduced.

Figure 4:
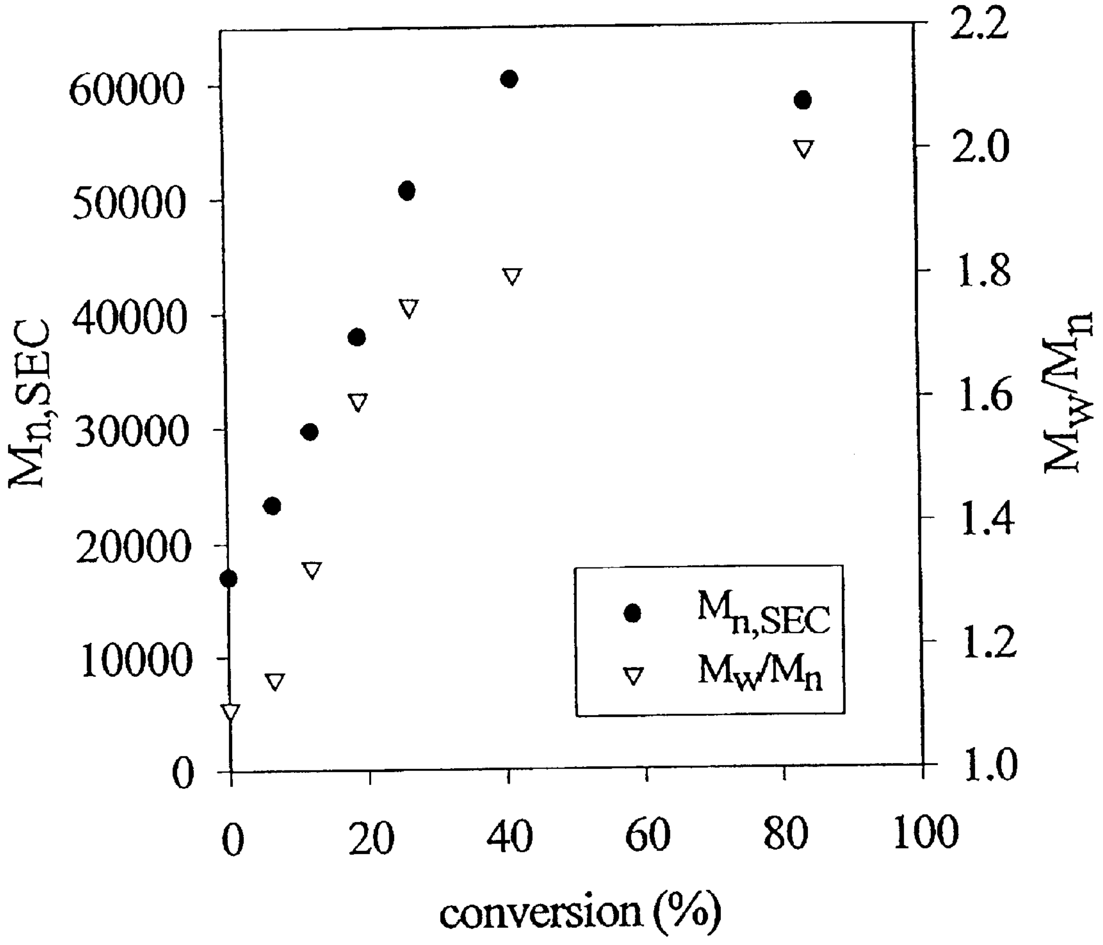
FIG. 4 shows the relationship between number average molecular weight and conversion for polymerizations according to the invention.

As may be seen from FIG. 4, the molecular weight of the polymers increased linearly as the % monomer conversion increased and the polydispersity remained low. For conversions up to 40% the polydispersity D is very low, for example D<1.5.

Example 4

Controlled Free-radical Polymerization of Tert-butyl Methacrylate in the Presence of Sodium Nitrite and Iron (III) Sulfate:

0.0414 g $NaNO_2$(6 *$10^{-4}$ mol) and 0.0735 g $Fe_2(SO_4)_3.5H_2O$ (1.5 *$10^{-4}$ mol) were introduced into a 50 ml reaction flask that had been evacuated by three nitrogen-vacuum cycles. 15 ml of degassed water and 8 ml of t-BMA (5 *$10^{-2}$ mol) were then added and the flask was thermally stabilized at 80° C. Finally, 0.0811 g of $K_2S_2O_8$ (3 *$10^{-4}$ mol) in 5 ml of water were added. Samples were regularly removed from the polymerization medium and the % monomer conversion was calculated by $^1$H-NMR analysis of the organic phase.

Figure 5:
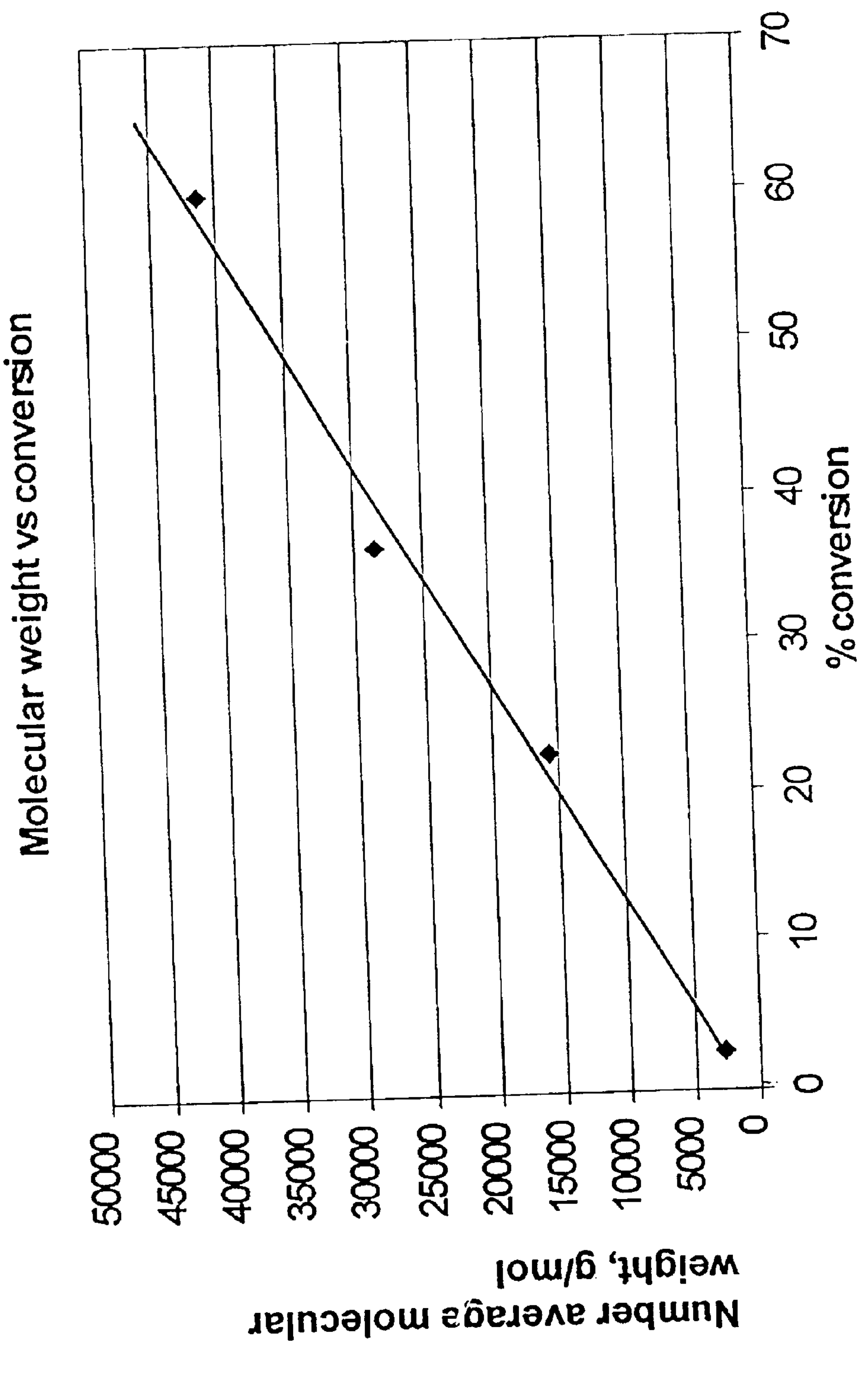
FIG. 5 shows the relationship between number average molecular weight and conversion for polymerizations according to the invention.

It may be seen from FIG. 5 that the use of Fe(III) is equivalent to the use of Fe(II) for controlling the free-radical polymerization of vinyl monomers in the presence of nitrites.

Example 5

Controlled Free-radical Polymerization of t-BMA in the Presence of Tert-butyl Nitrite and 2-mercaptoethanol in an Aqueous Medium:

In a 50 ml one-necked round bottom flask fitted with a three-way stopcock connected to either a nitrogen line or a vacuum pump were added 16 ml t-BMA ($10^{-1}$ mol) and 11 ml water. The flask was then immersed in an oil bath thermally stabilized at 80° C. Then 2 ml of a 0.6 mol/l degassed solution of 2-mercaptoethanol in toluene (1.2 *$10^{-3}$ mol) and 2 ml of a 0.66 mol/l degassed solution of tert-butyl nitrite in toluene (1.3 *$10^{-3}$ mol) were added to the flask. After a reaction time of 5 minutes the degassed initiator solution (0.1974 g $K_2S_2O_8$in 5 ml of water; 7.3 *$10^{-4}$ mol) was added to the reaction flask. Samples were regularly removed from the polymerization medium and the % monomer conversion was calculated by $^1$H-NMR. After the evaporation of the residual monomer and solvent, the polymer was dried in vacuo at 80° C.

Figure 6:
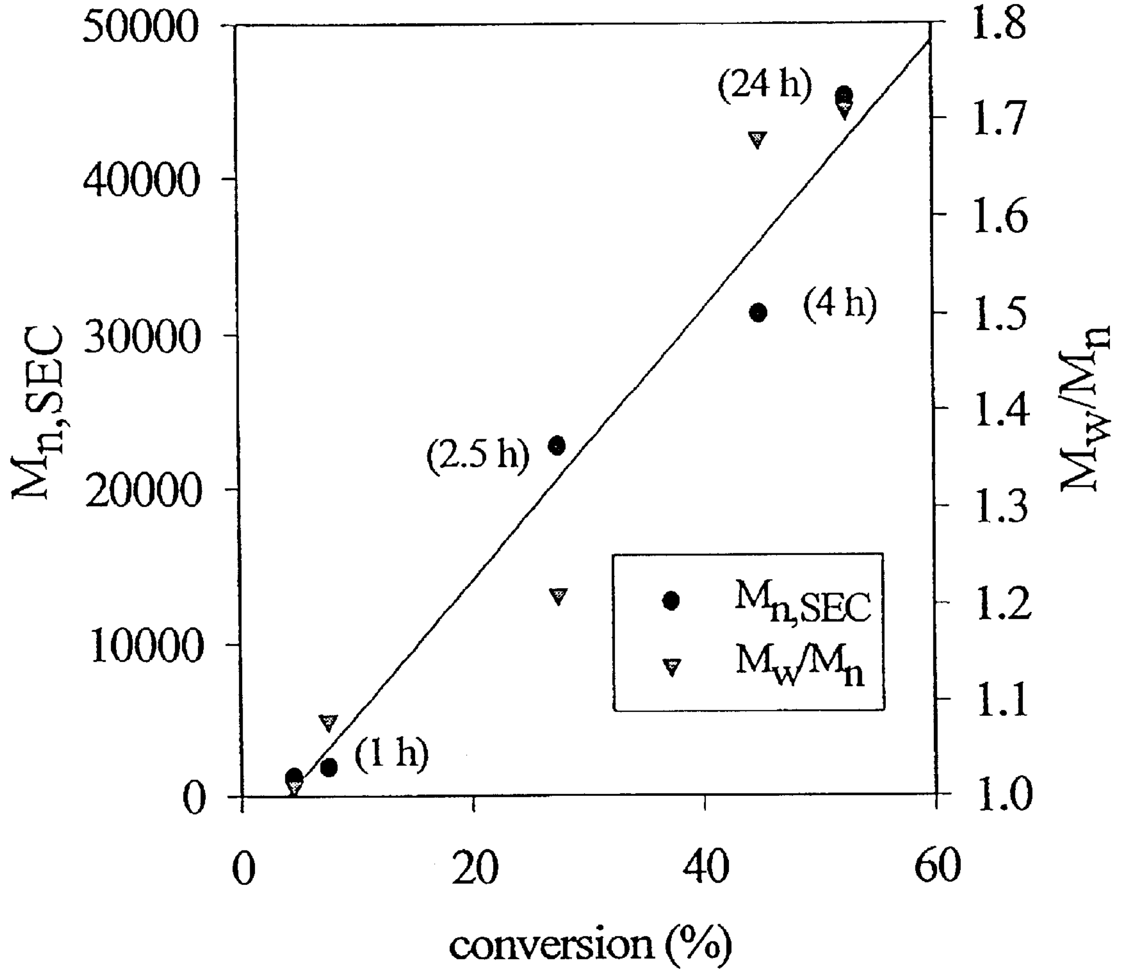
FIG. 6 shows the relationship between number average molecular weight and polydispersity versus conversion for polymerizations according to the invention.

FIG. 6 shows that the combination of an organic nitrite and a reducing agent is also suitable for controlling the free-radical polymerization of vinyl monomers.

Example 6

Figure 7:
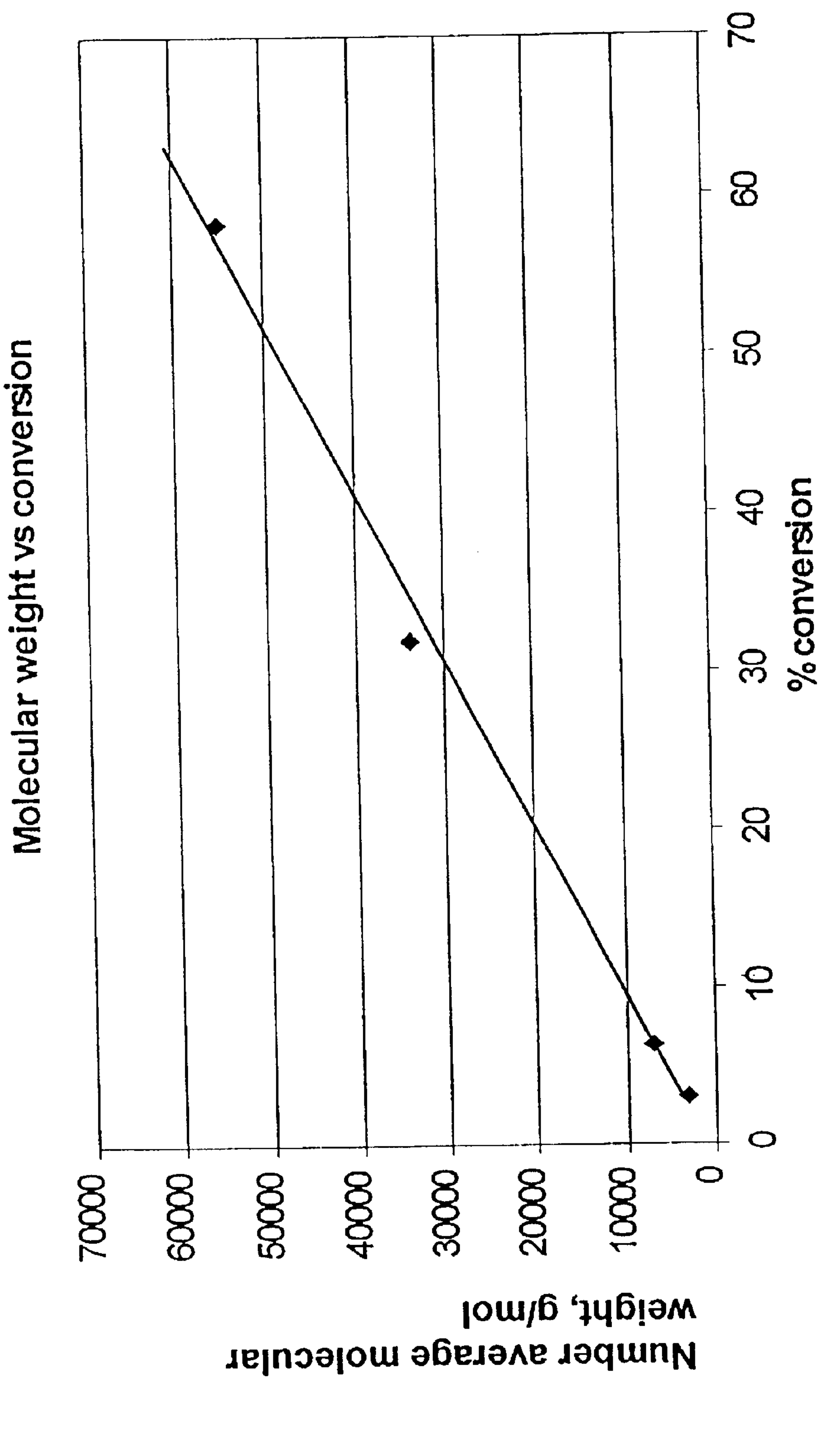
FIG. 7 shows the relationship between number average molecular weight and conversion for polymerizations according to the invention.

Controlled Free-radical Polymerization of t-BMA in the Presence of Sodium Nitrite and Acetic Acid in an Aqueous Medium:

0.0207 g $NaNO_2$ (3 *$10^{-4}$ mol) were introduced into a 50 ml reaction flask that had been evacuated by three nitrogen-vacuum cycles. 10 ml of degassed water and 8 ml of t-BMA (5 *$10^{-2}$ mol) were then added, and the flask was thermally stabilized at 80° C. Finally 2.5 ml of a solution of 0.2 ml of acetic acid in 50 ml of water (1.75 *$10^{-4}$ mol) were added, followed by a solution of 0.0811 g of $K_2S_2O_8$ in 5 ml of water (3 *$10^{-4}$ mol). Samples were regularly removed from the polymerization medium and the monomer conversion was calculated by gravimetry after drying at 80° C. in vacuo. FIG. 7 shows the linear increase of the average molecular weight of the polymer as the % monomer conversion increases. This indicates the control of the free-radical polymerization in the presence of sodium nitrite and acetic acid.

Example 7

Reaction of Methyl Methacrylate (MMA) with Sodium Nitrite and Sulfuric Acid at 0° C. Controlled Free-radical Polymerization of MMA in the Presence of Intermediate Compound I:

I) Synthesis of the Intermediate Compound I:

A solution of non-degassed sodium nitrite (12.903 g of sodium nitrite in 30 ml of water; 0.187 mol) was added to 20 ml of non-degassed MMA (0.187 mol) in 80 ml of diethyl ether at 0° C. The reaction flask was connected to a funnel containing a solution of 10 ml of concentrated sulfuric acid in 30 ml of water (0.177 mol) and sealed with a bubbling apparatus. Then, the sulfuric acid solution was added dropwise to the solution of MMA. After a reaction time of 3h at 0° C., the organic phase was extracted by $CH_2Cl_2$ and washed three times with water. The organic phase was finally dried with $MgSO_4$, filtered and the solvent and residual monomer were eliminated in vacuo at room temperature. 5.14 g of intermediate compound I (white solid) was collected. In this case the initiator for the formation of the intermediate compound I consists of traces of nitrogen dioxide (1% or less) produced by the decomposition of the sodium nitrite in the presence of sulfuric acid.

II) Polymerization:

0.067 g of AlBN (4.1 *$10^{-4}$ mol) and 0.096 g of the intermediate compound I were introduced into the reaction flask that had been previously evacuated by three nitrogen-vacuum cycles. 6 ml of degassed toluene and 6 ml of MMA (5.64 g; 5.6 *$10^{-2}$ mol) were then added to the flask that was thermally stabilized at 60° C. Samples were regularly removed from the polymerization medium and the % monomer conversion was calculated gravimetrically after drying at 80° C. in vacuo, taking into account the amounts of initiator and intermediate product I initially used.

Figure 8:
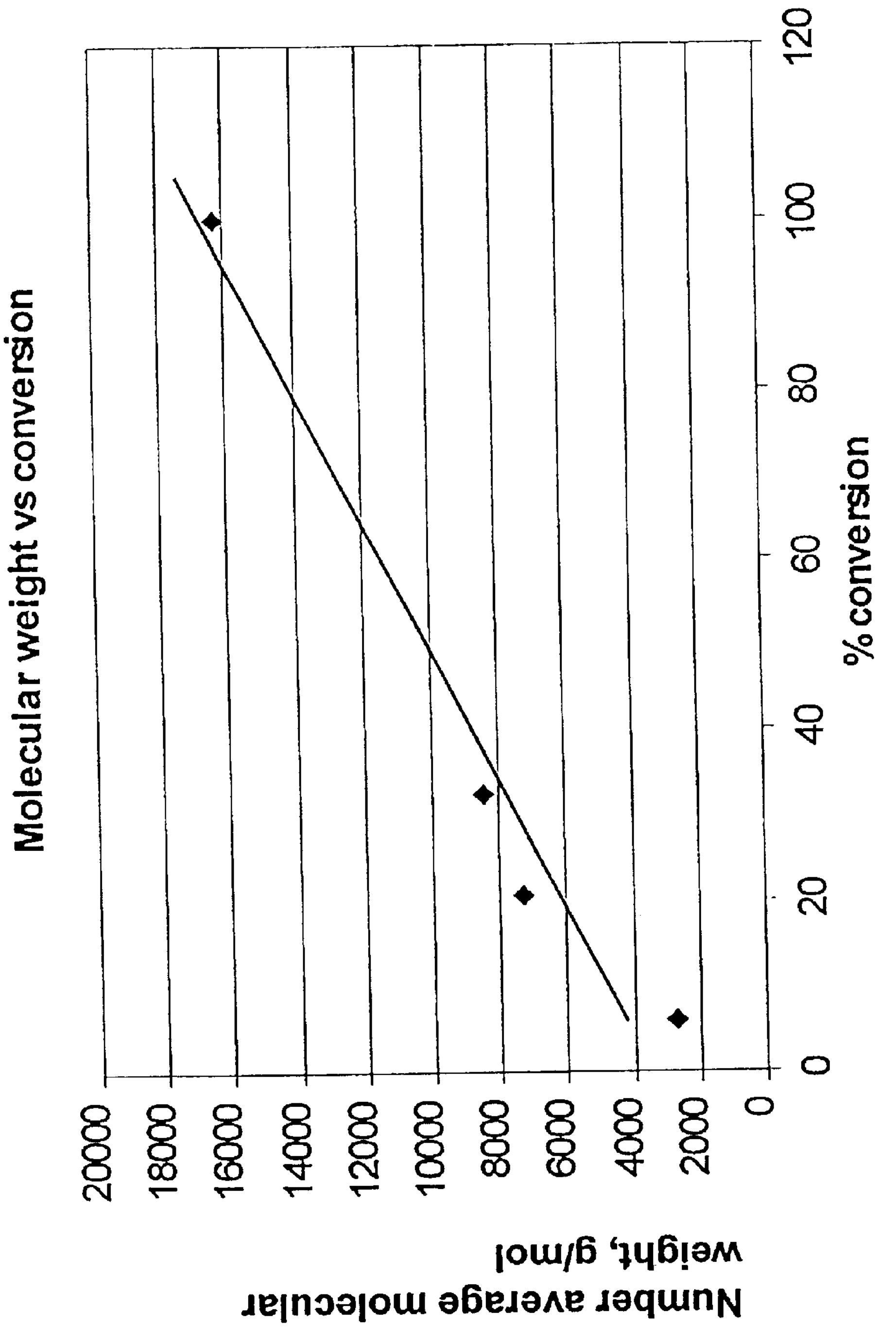
FIG. 8 shows the relationship between number average molecular weight and conversion for polymerizations according to the invention.

FIG. 8 shows the linear increase in the average molecular weight of the polymer as the % monomer conversion increases. This indicates the control of the free-radical polymerization.

Example 8

Synthesis of Intermediate Compound II in the Presence of NO-gas and Controlled Free-radical Polymerization of t-BMA Initiated by AlBN in the Presence of Intermediate Compound II.

Synthesis of Intermediate Compound II:

Nitrogen monoxide is synthesized according to the literature (Blanchard, A. A.; lnorg. Syn. 1946, 2, 126) by the dropwise addition over 2h of 64.4 ml of a 1M degassed solution of sodium nitrite in water (6.4 *$10^{-2}$ mol $NaNO_2$) to 72 ml (5.5 *$10^{-2}$ mol $FeSO_4$) of a degassed solution prepared by dissolving 278 g $FeSO_4.7H_2O$ and 55 ml 95% $H_2SO_4$ in 1 liter of water. A slow stream (100 ml/min) of nitrogen is passed through the reaction vessel in order to transport the non-purified nitrogen monoxide into 30 ml (0.19 mol) of degassed t-BMA in a second vessel at room temperature. The monomer rapidly turns blue. After a reaction time of 3h, the residual monomer is eliminated in vacuo to leave 1.5 g of the intermediate compound II as a viscous light-green solid. Similar results are obtained if the monomer and the various solutions are not degassed.

Polymerization Using the Intermediate Compound II:

In a typical procedure, 0.1 g of the intermediate compound II is introduced into a 50 ml reaction flask that had previously been evacuated by three nitrogen-vacuum cycles. 4 ml of degassed toluene and 5 ml of t-BMA (3.2 *$10^{-2}$ mol) are then added to the flask that is thermally stabilized at 60°

Figure 9:
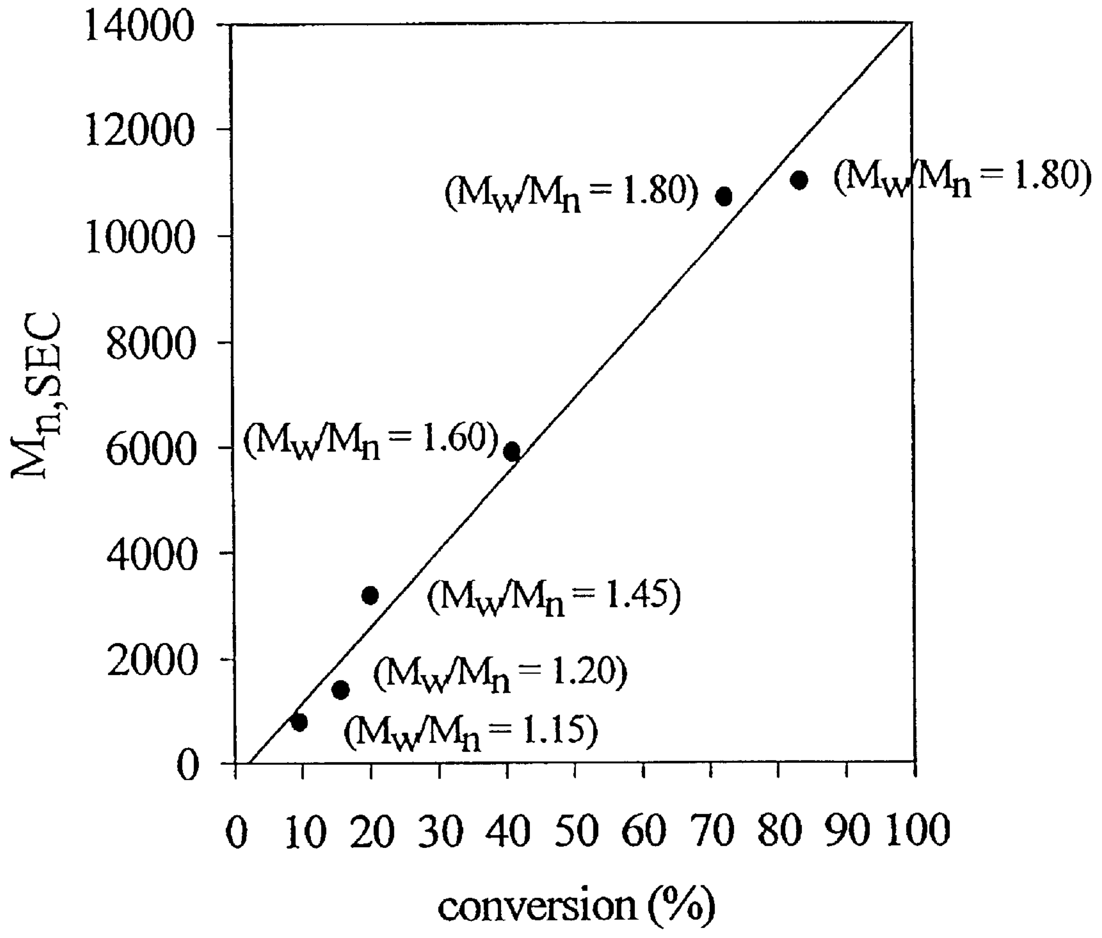
FIG. 9 shows the relationship between number average molecular weight and conversion for polymerizations according to the invention.
Figure 10:
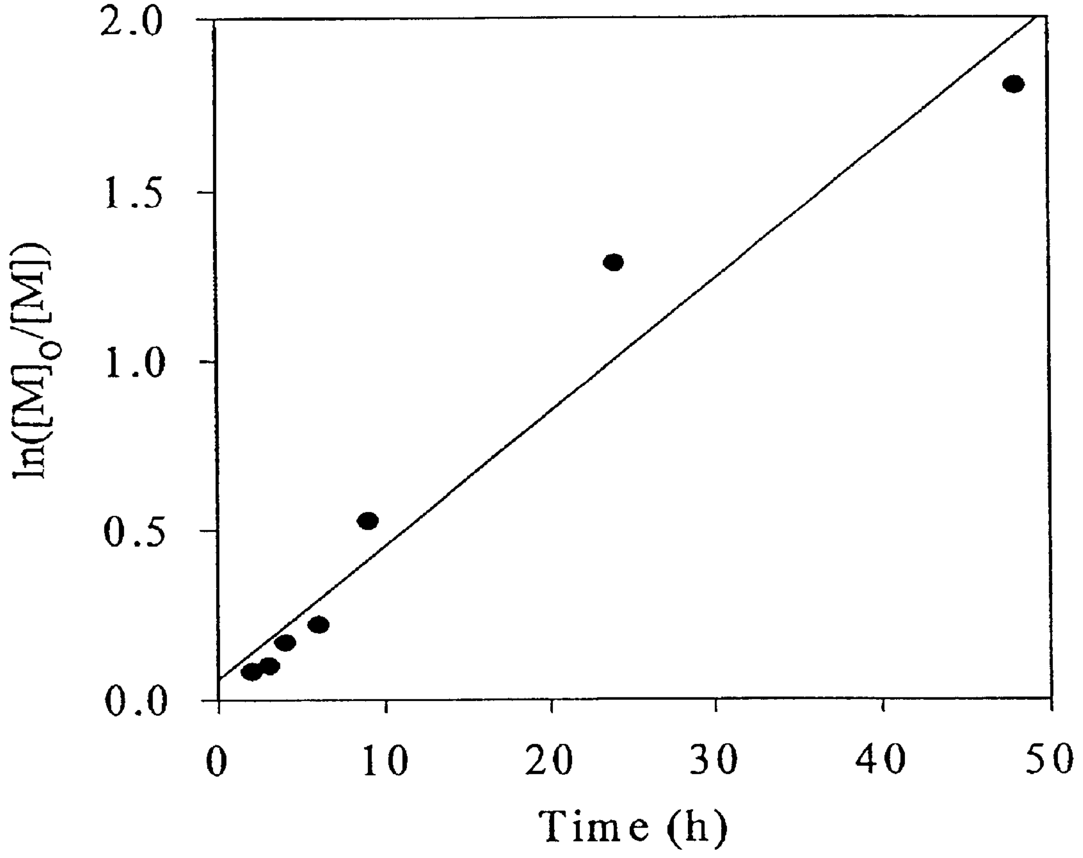
FIG. 10 shows the relationship between number average molecular weight and time for polymerizations according to the invention.

C. Finally, 1 ml ($3.4 * 10^{-4}$ mol) of a solution of 0.555 g AlBN in 10 ml toluene is added to the reaction flask. Samples are regularly removed from the polymerization medium and the monomer conversion is calculated gravimetrically after drying at 80° C. in vacuo, taking into account the amounts of initiator and intermediate product II initially used. The plots of experimentally determined $\overline{M}_n$ versus conversion (FIG. 9) and $In[M]_o/[M]$ versus time (FIG. 10) are linear, which indicate that the polymerization is controlled.

Example 9

Figure 11:
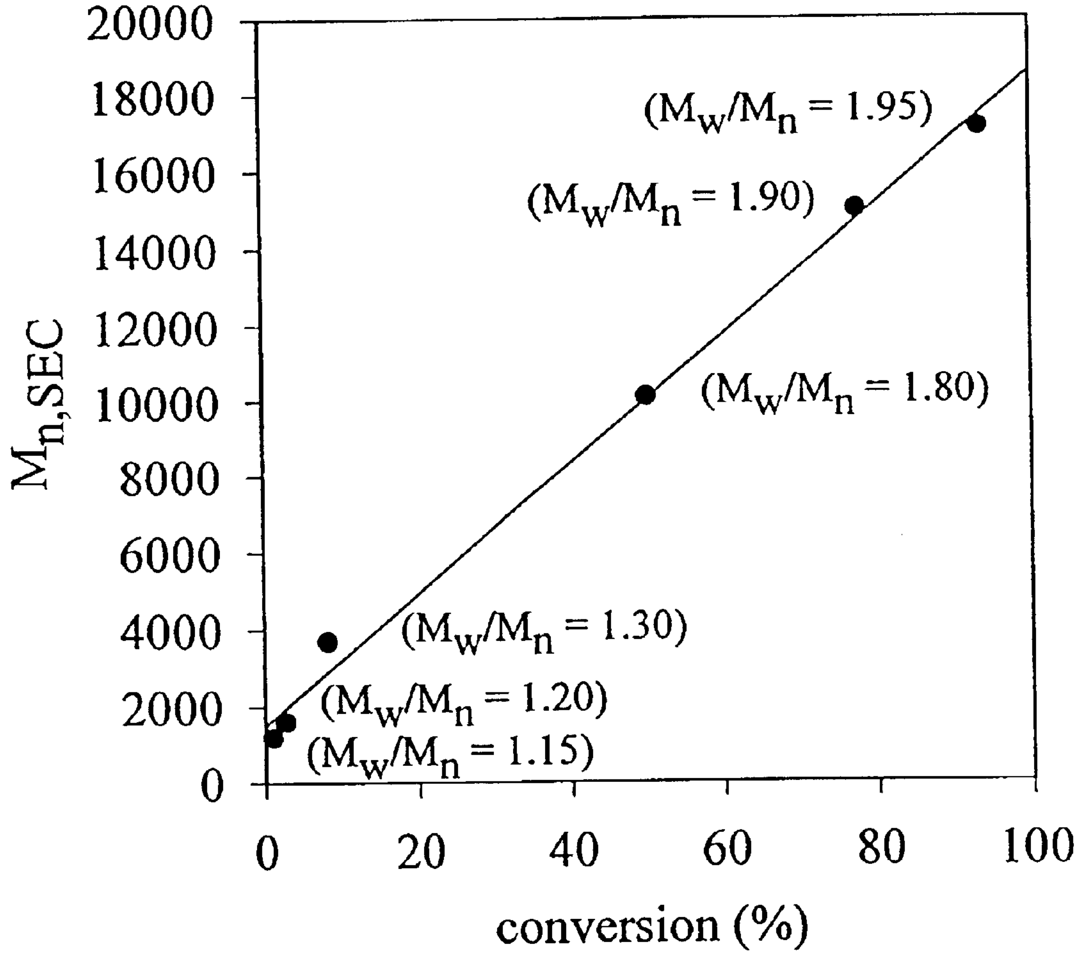
FIG. 11 shows the relationship between number average molecular weight and conversion for polymerizations according to the invention.
Figure 12:
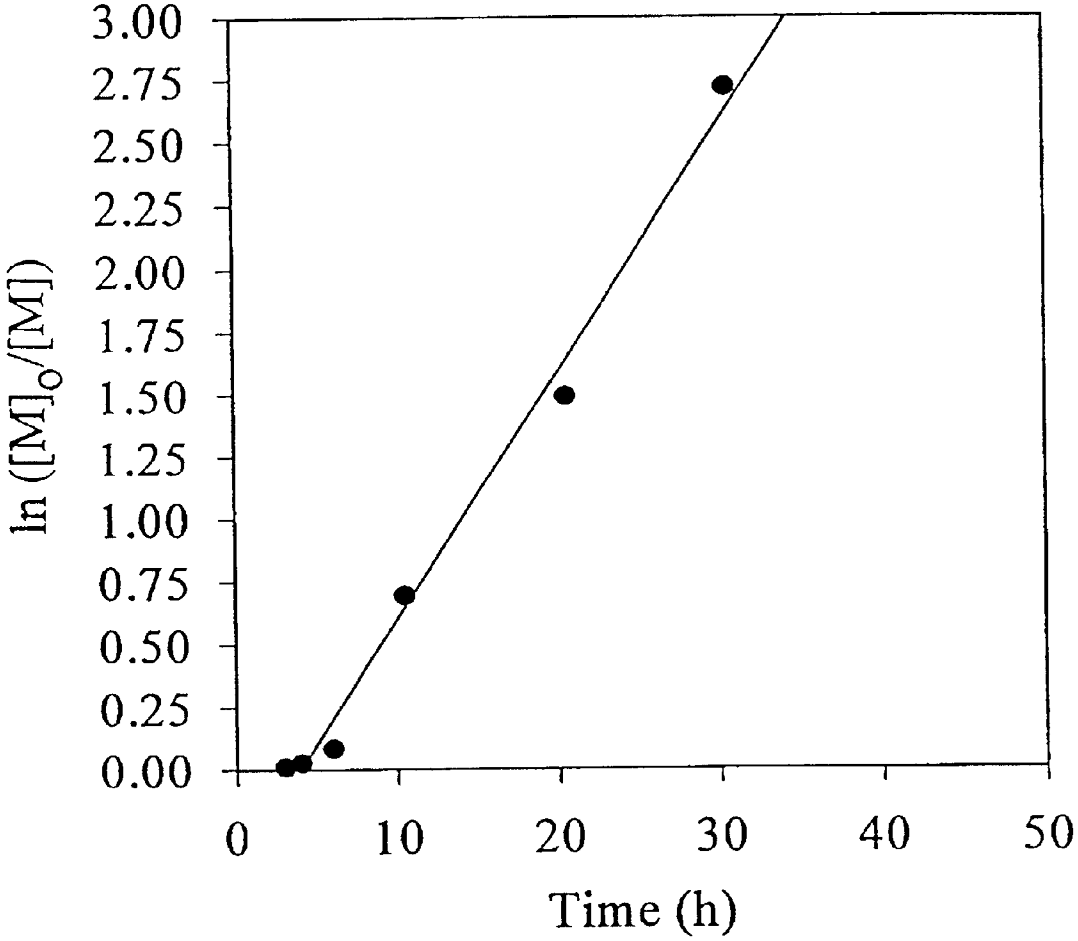
FIG. 12 shows the relationship between number average molecular weight and time for polymerizations according to the invention.

Synthesis of Intermediate Compound III in the Presence of NO-gas and Controlled Free-radical Polymerization of t-BMA Initiated by AlBN in the Presence of Intermediate Compound III:

Using the same method as in example 1 but using MMA instead of t-BMA in the first reaction step (synthesis of intermediate compound III (white solid) instead of intermediate compound II), the results reported in FIGS. 11 and 12 are obtained for the polymerization of t-BMA.

Example 10

Block Copolymer Poly(benzylmethacrylate-b-t-butyl methacrylate):

1) Polybenzylmethacrylate Macroinitiator 0.5 g of the intermediate compound III from example 9 is introduced into a 50 ml reaction flask that had previously been evacuated by three nitrogen-vacuum cycles. 10 ml of degassed toluene and 10 ml of BeMA ($3.2 * 10^{-2}$ mol) are then added to the flask that is thermally stabilized at 60° C. Finally, 0.0984 g ($3.4 * 10^{-4}$ mol) AlBN are added to the reaction flask. After a reaction time of 17 hours the resulting polymer is recovered and purified by precipitating twice in heptane and drying 24h in vacuo at room temperature. 1.8 g (20% conversion) of PBeMA ($\overline{M}_n$=16000, D=1.8) are obtained.

2) Resumption with t-BMA 0.2 g of the PBeMA obtained in step 1 were dissolved in 2 ml toluene and 2 ml t-BMA. The system was heated at 80° C. and the polymerization was carried out for 18 h. After precipitation in heptane 1.7 g of a white polymer displaying $\overline{M}_n$=70000 and D=2.7 are obtained (85% conversion for the second monomer). SEC analysis with UV and refractive index detectors shows that the molecular weight distribution is bimodal and that part of the PBeMA from step 1 initiated the polymerization of t-BMA with formation of a poly (benzylmethacrylate-b-t-butylmethacrylate) block copolymer. The second peak in the SEC-chromatogram is due to PBeMA deactivated during the purification step from step 1 and accounts for the increased polydispersity of the crude polymerization product from step 2.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A process for the production of polymers comprising (i) reacting at least one polymerizable vinyl monomer with nitrogen monoxide and at least one free radical initiator to prepare a free-radical containing compound of the general formula (I),

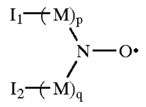

(I)

in which

M represents a polymerizable vinyl monomer, p is an integer of 1 to 15 , q is an integer of 1 to 15 and $I^1$ and $I^2$ independently one of the other is an organic radical of a free-radical initiator, and (ii) polymerizing at least one polymerizable vinyl monomer in the presence of the free radical containing compound of general formula (I) obtained in (i) optionally together with one or more additional free-radical initiators wherein the nitrogen monoxide is provided in gaseous form or is formed in situ by reaction of a nitrite compound and an activator component.

2. The process according to claim 1 wherein (i) and (ii) are carried out in the form of a one-pot synthesis.

3. The process according to claim 1 wherein the nitrogen monoxide is introduced directly into the reaction in the form of a nitrogen oxide gas.

4. The process of claim 1 wherein the nitrogen monoxide is produced by an in situ reaction between a nitrite compound and an activator component.

5. The process according to claim 4 wherein the activator component is a member selected from the group consisting of reducing agents, oxidizing agents and acids.

6. The process according to claim 1 characterized in that nitrogen monoxide is in pure form.

7. The process according to claim 1 characterized in that nitrogen monoxide is in a mixture with gaseous nitrogen oxides of the general formula (II)

$$N_x O_y \quad (II)$$

in which a) x is 1 and y is 2 or b) x is 2 and y is 1,3,4 or 5.

8. The process according to claim 4, characterized in that the nitrite component is a member selected from the group consisting of inorganic nitrite compounds and organic nitrite compounds.

9. A process according to claim 8, characterized in that the inorganic nitrite compounds conform to formula (III)

$$Z(NO_2)_n \quad (III)$$

in which

Z is a member selected from the group consisting of alkaline metals, alkaline earth metals, earth metals, transition metals, lanthanides, actinides, $Sn^{2+}$, $Sn^{4+}$, $In^{3+}$, $Tl^{+}$, $Tl^{3+}$, $Pb^{2+}$, $Bi^{3+}$, $Sb^{3+}$, $Sb^{5+}$ and $NH_4^{+}$, and n is 1 to 5.

10. The process according to claim 8, wherein the organic nitrite compounds conform to formula (IV), $$R—O—N=O \quad (IV)$$

in which

R is an organic radical containing at least 2 carbon atoms and another functional group selected from the group consisting of esters, thioesters, ethers, thioethers, alcohols, thiols, amines, amides, imines, imides, urethanes, halogen, nitro, nitroso, nitrates, nitrites, sulfates, sulphones, nitrile, carboxylic acids, carboxylic anhydrides, aldehydes and ketones.

* * * * *